(12) United States Patent
Flemin et al.

(10) Patent No.: US 10,677,533 B2
(45) Date of Patent: Jun. 9, 2020

(54) HEAT EXCHANGE DEVICE FOR ARTIFICIAL SATELLITE, WALL AND ASSEMBLY OF WALLS COMPRISING SUCH A HEAT EXCHANGE DEVICE

(71) Applicant: AIRBUS DEFENCE AND SPACE SAS, Les Mureaux (FR)

(72) Inventors: Christian Flemin, Dremil-Lafage (FR); Typhaine Coquard, Toulouse (FR); Andrew Walker, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 15/772,444

(22) PCT Filed: Nov. 16, 2016

(86) PCT No.: PCT/FR2016/052966
§ 371 (c)(1),
(2) Date: Apr. 30, 2018

(87) PCT Pub. No.: WO2017/085399
PCT Pub. Date: May 26, 2017

(65) Prior Publication Data
US 2018/0320983 A1    Nov. 8, 2018

(30) Foreign Application Priority Data
Nov. 16, 2015   (FR) ...................... 15 61010

(51) Int. Cl.
*F28D 15/02*   (2006.01)
*B64G 1/50*   (2006.01)
(Continued)

(52) U.S. Cl.
CPC ......... *F28D 15/0275* (2013.01); *B64G 1/506* (2013.01); *F28D 15/0233* (2013.01);
(Continued)

(58) Field of Classification Search
CPC ......... F28F 7/02; F28F 13/00; F28D 15/0275; F28D 15/0233; F28D 15/04; F28D 2021/0021; B64G 1/506; B64G 1/503
See application file for complete search history.

(56) References Cited

U.S. PATENT DOCUMENTS

| 3,640,517 A | 2/1972 | Sendt |
| 4,880,050 A * | 11/1989 | Nakamura ............... B64G 1/50 165/41 |

(Continued)

FOREIGN PATENT DOCUMENTS

| DE | 20 2007 008221 U1 | 10/2007 |
| FR | 2 038 204 A1 | 1/1971 |

(Continued)

OTHER PUBLICATIONS

KR20100089553A machine translation (Year: 2010).*
(Continued)

*Primary Examiner* — Keith M Raymond
*Assistant Examiner* — Gordon A Jones
(74) *Attorney, Agent, or Firm* — Young & Thompson (57) ABSTRACT

Disclosed is a heat exchange device for effecting a heat exchange between a heat transfer fluid of a first network of capillary heat pipes and a heat transfer fluid of a second network of capillary heat pipes. The heat exchange device includes a solid block provided with a first channel and a second channel which are independent of one another, the first channel having at least one opening intended to be connected to a capillary heat pipe of the first network, the second channel having at least one opening intended to be connected to a capillary heat pipe of the second network, the first channel having a portion which lies near a portion of the second channel such that the heat transfer fluid of the first (Continued)

network is able to exchange heat with the heat transfer fluid of the second network via the heat exchanging portions.

15 Claims, 8 Drawing Sheets

(51) Int. Cl.
*F28F 7/02* (2006.01)
*F28D 15/04* (2006.01)
*F28F 13/00* (2006.01)
*F28D 21/00* (2006.01)

(52) U.S. Cl.
CPC ............... *F28D 15/04* (2013.01); *F28F 7/02* (2013.01); *F28F 13/00* (2013.01); *B64G 1/503* (2013.01); *F28D 2021/0021* (2013.01)

(56) References Cited

U.S. PATENT DOCUMENTS

| | | | | |
|---|---|---|---|---|
| 4,880,052 A * | 11/1989 | Meyer, IV | ............ | F28D 15/0233 165/104.14 |
| 5,213,153 A | 5/1993 | Itoh | | |
| 5,216,580 A * | 6/1993 | Davidson | ............ | F28D 15/0266 361/700 |
| 5,506,032 A | 4/1996 | Rowe | | |
| 6,034,872 A * | 3/2000 | Chrysler | ............ | F25B 41/04 165/165 |
| 6,341,062 B1 | 1/2002 | Patel | | |
| 7,000,684 B2 * | 2/2006 | Kenny | ............ | F04B 17/00 165/104.21 |
| 7,025,125 B2 * | 4/2006 | Sheng | ............ | F28D 15/0233 165/104.21 |
| 7,540,318 B2 * | 6/2009 | Nitta | ............ | F28D 15/0233 165/104.26 |
| 8,240,612 B2 | 8/2012 | Jondeau et al. | | |
| 2003/0121639 A1 | 7/2003 | Nomura | | |
| 2006/0243427 A1 * | 11/2006 | Kitajima | ............ | H01L 23/427 165/104.33 |
| 2010/0243817 A1 | 9/2010 | McKinno et al. | | |
| 2011/0209864 A1 | 9/2011 | Figus et al. | | |
| 2013/0083485 A1 * | 4/2013 | Tong | ............ | H01L 23/427 361/700 |
| 2014/0010087 A1 * | 1/2014 | Anthony, Jr. | ............ | H04L 47/12 370/236 |
| 2014/0158325 A1 * | 6/2014 | Gwin | ............ | F28D 15/04 165/104.26 |
| 2016/0305714 A1 * | 10/2016 | Smith | ............ | B23P 15/26 |

FOREIGN PATENT DOCUMENTS

| | | | | |
|---|---|---|---|---|
| FR | 2 905 933 A1 | 3/2008 | | |
| FR | 2 938 323 A1 | 5/2010 | | |
| JP | S60 82782 A | 5/1985 | | |
| JP | 61-113265 | 5/1986 | | |
| JP | 62-66094 | 3/1987 | | |
| JP | 07-294168 | 11/1995 | | |
| JP | H09 324991 A | 12/1997 | | |
| JP | 2996843 B2 * | 1/2000 | ......... | F28D 15/0275 |
| JP | 2004-003816 | 1/2004 | | |
| JP | 2013120053 A | 6/2013 | | |
| KR | 20100089553 A * | 8/2010 | ......... | F28D 15/0233 |
| KR | 20100089553 A | 8/2010 | | |

OTHER PUBLICATIONS

JP2996843B2 machine translation (Year: 2000).*
Database WPI Section Ch Week 201055, Derwent World Patents Index; Class L03, AN 2010-K28233, XP002760878.
Database WPI Section PQ Week 201341, Derwent World Patents Index; Class Q78, AN 2013-K89277, XP002760877.
International Search Report, dated Feb. 10, 2017, from corresponding PCT/FR2016/052966 application.
Japanese Official Action—2018-521633—dated Oct. 2, 2018.

* cited by examiner

HEAT EXCHANGE DEVICE FOR ARTIFICIAL SATELLITE, WALL AND ASSEMBLY OF WALLS COMPRISING SUCH A HEAT EXCHANGE DEVICE

The present invention lies in the field of spacecraft.

In particular, the present invention relates to controlling the heat of geostationary communication satellites.

Due to the revolution of the Earth around the sun, the different faces of a geostationary satellite do not receive the same amount of sunlight during the day and across the seasons. This results in significant temperature differences between satellite faces as well as cyclic variations in these temperatures during the day and across the seasons. These temperature differences and temperature variations over time are stressful to the satellite and its payload.

To reduce these differences and these temperature variations, heat exchange systems are usually put in place. These heat exchange systems collect the heat generated by the payload or by solar radiation or radiation from a planet, convey it in order to achieve uniformity between the different regions of the satellite, and finally release it into space by means of radiative surfaces. These heat exchange systems ensure that the thermal operating range of electronic devices are not exceeded throughout the life of the satellite, during ground testing and for the duration of the mission, because overheating and overcooling a device can damage it or accelerate its aging.

To release the heat dissipated by electronic devices, U.S. Pat. No. 5,506,032 proposes creating a honeycomb panel comprising a first network of heat pipes embedded in the panel and a second network of heat pipes mounted on the panel. The heat pipes of the first network extend in a given direction. The heat pipes of the second network extend in a direction perpendicular to the given direction. The heat transfer from one network to the other is ensured by thermal conduction in the areas where the heat pipes intersect.

This architecture is robust and provides redundancy if a heat pipe is pierced or there is an internal malfunction. However, this architecture is bulky and has sizeable weight. It is also inefficient due to the large number of interfaces between the electronic devices and the radiator (often four to five interfaces). These interfaces form contact thermistors. This results in a large temperature gradient between the electronic devices and the radiator, and low heat dissipation. However, the current trend is to install increasingly complex electronic devices that emit a greater amount of heat, while increasing the number of devices per square meter of satellite wall.

The purpose of the present invention to provide a heat exchange device that is more efficient during nominal operation for various load configurations of the electronic devices and during a degraded mode after failure or damage on the ground or in orbit, and that is more compact within the satellite as well as less complex to install.

To this end, the present invention relates to a heat exchange device for effecting a heat exchange between a heat transfer fluid of a first network of capillary heat pipes and a heat transfer fluid of a second network of capillary heat pipes, characterized in that it comprises a solid block provided with at least a first channel and a second channel which are independent of one another, each channel having a capillary internal structure, the first channel having at least one opening intended to be connected to a capillary heat pipe of the first network, the second channel having at least one opening intended to be connected to a capillary heat pipe of the second network, the first channel having a portion which lies near a portion of the second channel such that, when the heat exchange device is connected to the first network and to the second network, the heat transfer fluid of the first network is able to exchange heat with the heat transfer fluid of the second network via said heat exchanging portions.

Advantageously, this heat exchange device also reduces the costs of the associated materials, and the costs of the human and material resources for testing.

Advantageously, this heat exchange device reduces the gross weight of the satellite during launch.

Advantageously, the heat exchange device is compact, inexpensive, and passive. It reduces the space required and facilitates assembly and disassembly operations. It is efficient in collecting heat, and provides redundancy in case of failure or holes pierced in heat pipes during testing or while in orbit due to micrometeorite impacts or internal malfunction.

Advantageously, this heat exchange device provides excellent temperature uniformity throughout the network regardless of the load configuration of the dissipative equipment of a satellite.

Advantageously, this heat exchange device improves the interconnections between a two-phase structure and a network of heat pipes, from a thermal point of view.

Advantageously, the width of the device facilitates its identification in a satellite wall, reducing the risk of accidental puncture by operators on the ground.

Advantageously, the heat exchange device has better thermal performance when operating under gravity (ground tests) in various orientations, due to the presence of multiple independent fluidic cavities coupled in multiple directions within the device. In particular, temperature gradients are reduced in the satellite panels due to this device. As a result, the dissipated power densities are higher compared to typical standard architectures having several independent heat pipe networks.

Advantageously, the use of this heat exchange device allows reducing the number and length of the heat pipes to be implemented in a satellite wall, thus providing a complete and less voluminous thermal solution. Use of this heat exchange device simplifies assembly operations and the number of parts to be assembled, as one simply needs to weld the heat pipes into the openings of the device.

Advantageously, this heat exchange device operates equally well for networks of two-phase structures in one plane, for example within the same satellite wall, or between different planes, for example thermally connecting perpendicular walls.

Advantageously, the manufacture of different embodiments of the heat exchange device can be standardized. These different embodiments may define families of standard devices that can be used generically or can be combined as required by the network as a whole.

Advantageously, the heat exchange device of the invention can be mounted under an electronic device, the heat transfer occurring in a direction perpendicular to the heat pipe which increases its efficiency. In addition, the size of the heat exchange device can be adapted to the size of the devices.

According to some particular embodiments, the heat exchange device comprises one or more of the following features:

the first channel and the second channel each comprise at least one side channel having a closed terminal end, said at least one side channel of the first channel extending parallel and adjacent to said at least one side channel of the second channel, said side channels being said heat exchanging portions;

said at least one side channel extends perpendicularly to each channel;

said at least one side channel extends in a direction forming an acute angle with a portion of each channel;

the first channel and the second channel comprise an additional opening intended to be connected to another capillary heat pipe of the first network and respectively of the second network;

said opening is located on a first face of said solid block, and said additional opening is located on a second face of said solid block, said first face being perpendicular to said second face;

said opening is located on a first face of said solid block, and said additional opening is located on a second face of said solid block, said first face being substantially parallel to said second face;

said heat exchanging portion of the first channel is located at a distance of between 1 millimeter and 3 millimeters from said heat exchanging portion of the second channel;

said solid block comprises a bearing face intended to be fixed to a panel of an artificial satellite, and the first channel and second channel are arranged in one and the same plane, said plane being parallel to said bearing face;

said solid block comprises a bearing face intended to be fixed to a panel of an artificial satellite, and the first channel and second channel are arranged in two separate planes, said planes being parallel to said bearing face;

the first channel and second channel have a general shape forming one of the patterns among a Greek key pattern, a tooth pattern, and a pattern of jagged lines, at least a portion of said first channel and at least a portion of said second channel being said heat exchanging portions;

the first channel comprises a longitudinal axis and a first cavity extending in a direction perpendicular to the longitudinal axis, and the second channel comprises a longitudinal axis and a second cavity extending in a direction perpendicular to the longitudinal axis, said first cavity and second cavity being said heat exchanging portions;

said solid block comprises a bearing face intended to be fixed to a panel of an artificial satellite, the first channel and second channel respectively comprising a first cavity and a second cavity which each extend in a plane parallel to said bearing face, said first cavity and second cavity being said heat exchanging portions;

each channel has a single opening to be connected to a heat pipe.

The invention also relates to a wall intended for mounting in an artificial satellite, said wall comprising a support panel, a first network of capillary heat pipes supported by said support panel, and a second network of capillary heat pipes supported by said support panel; characterized in that it comprises at least one heat exchange device according to the above features, supported by said support panel, each channel having two openings to the exterior, the first channel of the heat exchange device being connected to capillary heat pipes of the first network, the second channel of the heat exchange device being connected to capillary heat pipes of the second network.

According to some particular embodiments, the wall has one or more of the following features:

the wall comprises at least one electronic device fixed to said support panel, in direct or indirect thermal contact with said heat exchange device;

the wall further comprises angles, and the capillary heat pipes of the first network are fixed to said angles so as to form a comb-shaped configuration;

the wall further comprises angles, and the capillary heat pipes of the first network are fixed to said angles so as to form an S-shaped configuration;

the wall further comprises angles, and the capillary heat pipes of the first network are fixed to said angles so as to form a matrix-shaped configuration, or in other words a grid.

Finally, the invention also relates to an assembly of a first wall and a second wall, intended for mounting in an artificial satellite, the first wall comprising a first panel and at least a first network of capillary heat pipes, the second wall comprising a second panel and at least a second capillary network of heat pipes, said assembly further comprising a heat exchange device having the features mentioned above and wherein said opening is located on a first face of said solid block and said additional opening is located on a second face of said solid block, said first face being perpendicular to said second face, the heat exchange device being supported by one among said first panel and second panel.

The invention will be better understood from reading the following description, provided as an example only and with reference to the figures in which.

Figure 1:
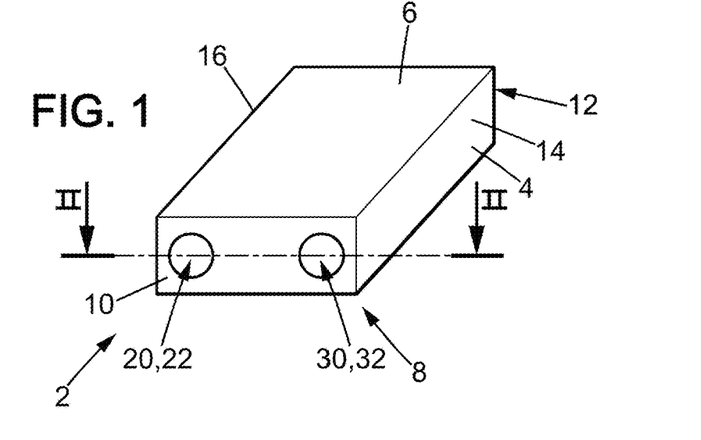
FIG. 1 is a perspective view of a heat exchange device according to a first embodiment of the present invention.

In the following description, the terms "top", "bottom", "lower", and "upper" are defined relative to when the heat exchange device of the invention is arranged as shown in FIG. 1, and are in no way limiting.

Figure 2:
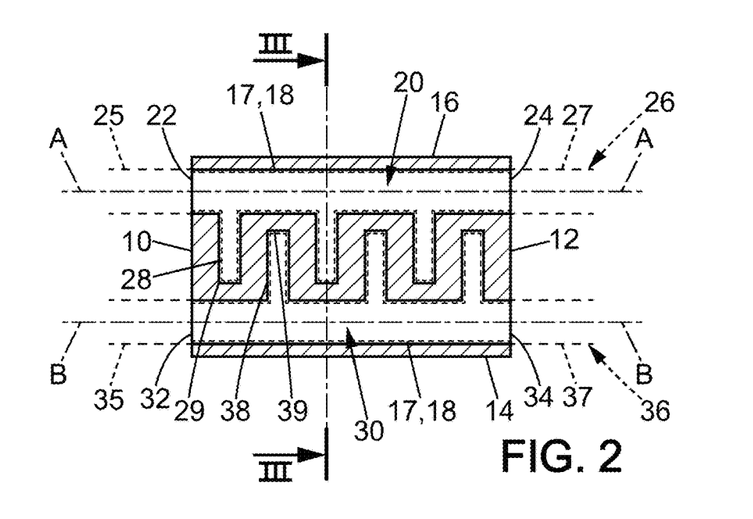
FIG. 2 is a sectional view of the device illustrated in FIG. 1, in the horizontal sectional plane illustrated in FIG. 1.
Figure 3:
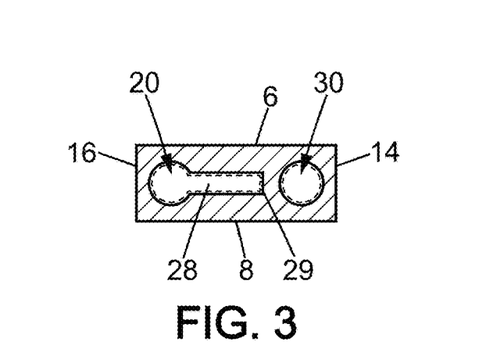
FIG. 3 is a sectional view of the device illustrated in FIG. 1, in the vertical sectional plane illustrated in FIG. 1.

Referring to FIGS. 1 to 3, the heat exchange device 2 according to a first embodiment of the invention consists of a solid block 4 preferably having a flat parallelepiped shape or the like.

The solid block 4 comprises an upper main face 6, a lower main face 8, a front face 10, a rear face 12, and two side faces 14, 16.

The upper main face 6 of the heat exchange device 2 and/or its lower main face 8 are bearing faces intended to be fixed to a panel of an artificial satellite or to the interior of a panel, for example inside a honeycomb panel. These faces are intended to be in direct or indirect contact with one or more electronic devices or with another heat exchange device 2. These faces constitute the base plate of the heat exchange device 2.

The solid block 4 is traversed by a first rectilinear channel 20 and a second rectilinear channel 30, each leading to an opening 22, 32 formed in the front face 10 and an additional opening 24, 34 formed in the rear face 12.

The opening 22 of the first channel is intended to be connected to a capillary heat pipe 25 of a first network 26 of capillary heat pipes, represented by dotted lines in FIG. 2. The additional opening 24 of the first channel is intended to be connected to another capillary heat pipe 27 of the first network of heat pipes.

Similarly, the opening 32 of the second channel is intended to be connected to a capillary heat pipe 35 of a second network 36 of capillary heat pipes, represented by dotted lines in FIG. 2. The additional opening 34 of the second channel is intended to be connected to another capillary heat pipe 37 of the second network of heat pipes 36.

The first channel 20 and the second channel 30 each have an inner wall 17 provided with a capillary structure 18 schematically represented by broken lines. This capillary structure 18 is, for example, a lattice formed by heating a metal powder using a laser.

Alternatively, the capillary structure 18 may be implemented as a mesh, a porous structure, or axial grooves.

The first channel 20 has a longitudinal axis A-A. The second channel 30 has a longitudinal axis B-B that is parallel to axis A-A.

The first channel 20 has side channels 28 having a closed end 29. The side channels 28 extend perpendicularly to the axis A-A of the first channel 20, towards the second channel 30.

Similarly, the second channel 30 also has side channels 38 having a closed end 39. The side channels 38 extend perpendicularly to the axis B-B of the second channel 30 and towards the first channel 20.

The side channels 28 of the first channel and the side channels 38 of the second channel alternate with one another. Thus, aside from the side channels 28, 38 at the ends (closest to the front face 10 and rear face 12), each side channel 28 of the first channel lies between two side channels 38 of the second channel and vice versa. Each side channel 28 of the first channel is near a side channel 38 of the second channel. More specifically, each side channel 28 of the first channel lies at an approximate distance of between 1 mm and 3 mm from a side channel 38 of the second channel. In this embodiment, each side channel 28 of the first channel extends parallel to a side channel 38 of the second channel. When the heat exchange device 2 is connected to the first network 26 of heat pipes and to the second network of heat pipes 36, these side channels arranged close to one another allow the transfer of heat from the heat transfer fluid contained in the first network 26, to the heat transfer fluid contained in the second network 36. These side channels 28, 38 constitute channel portions of one network that can exchange heat with channel portions of another network. These heat exchanges even out the temperature of the two networks and guarantee redundancy in the heat transport and elimination function. In case of malfunction of a heat pipe network, for example due to a hole being pierced in a heat pipe, the other network of heat pipes can provide this function.

The length and number of the side channels 28, 38 are variable, to enable providing the best response to the requirements of the satellite mission.

The heat exchange device 2 is preferably made of a homogeneous material in order to ensure uniform thermal conduction, this material having high thermal conductivity. It is for example made of an aluminum alloy, for example such as AlSi10 mg. In this case, it can be made by a process of additive layer manufacturing.

Alternatively, the heat exchange device 2 may be made of multiple materials in order to impart different properties to different areas of the device. For example, the heat exchange device 2 may comprise a first material for its internal portion and another material for the face which will constitute its base plate, namely its upper main face 6 or its lower main face 8.

Figure 4:
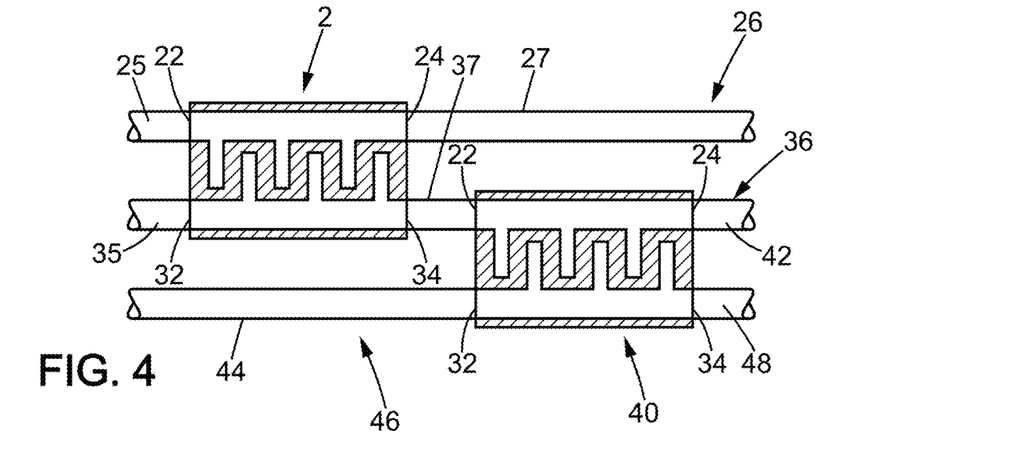
FIG. 4 is a sectional view of an example implementation of two heat exchange devices according to the first embodiment of the invention, the sectional plane being the same horizontal sectional plane as the sectional plane of FIG. 2.

FIG. 4 illustrates an example implementation of two heat exchange devices 2, 40 according to the first embodiment, enabling heat transfer between three networks of heat pipes 26, 36, 46. In this example, the heat pipes 25 and 27 of the first network 26 are respectively welded to the opening 22 and the additional opening 24 of the first channel of a first device 2. The heat pipes 35 and 37 of the second network 36 are welded to the opening 32 and the additional opening 34 of the second channel of the first device 2. Heat pipe 37 of the second network is welded to the opening 22 of the first channel of the second device 40. A heat pipe 42 is welded to the additional opening 24 of the first channel of the second device 40. Heat pipes 44 and 48 of a third network 46 are respectively welded to the opening 32 and the additional opening 34 of the second device.

The first heat exchange device 2 transports heat between the first network 26 and second network 36. The second heat exchange device 40 transports heat between the second network 36 and the third network 46. The heat exchange devices 2, 40 according to the invention provide excellent thermal uniformity throughout the three networks of heat pipes 26, 36, 46.

FIGS. 5 to 16 show different embodiments of the heat exchange device. These various embodiments comprise elements identical or similar to the elements of the heat exchange device 2 according to the first embodiment of the invention. These identical or similar elements bear the same references as in the description of the heat exchange device 2 according to the first embodiment, and will not be described again. Only the features specific to each of these embodiments are described below.

Figure 5A:
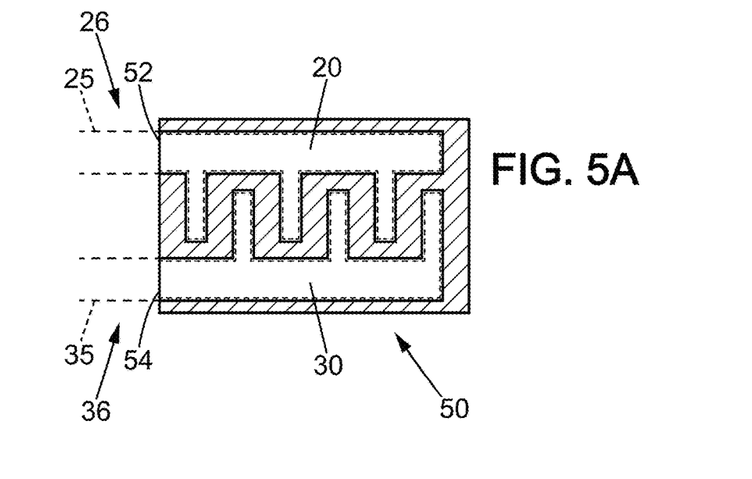
FIGS. 5 to 9, 14 and 15 are sectional views of the heat exchange device according to nine different embodiments of the invention, respectively the second to eighth and tenth and eleventh embodiments, in a horizontal sectional plane similar to the sectional plane shown in FIG. 2.

Referring to FIG. 5A, the first channel 20 and second channel 30 of the heat exchange device 50 according to the second embodiment comprise a single opening 52, 54 in the front face 10. Such a heat exchange device 50 is intended to be connected to a single heat pipe 25 of the first network and a single heat pipe 35 of the second network. It is adapted for connection at the end of the first 26 and second 36 networks. This second embodiment may be used in addition to the first embodiment shown in FIG. 4, being connected at the end of the first 26 and third 46 networks.

Figure 5B:
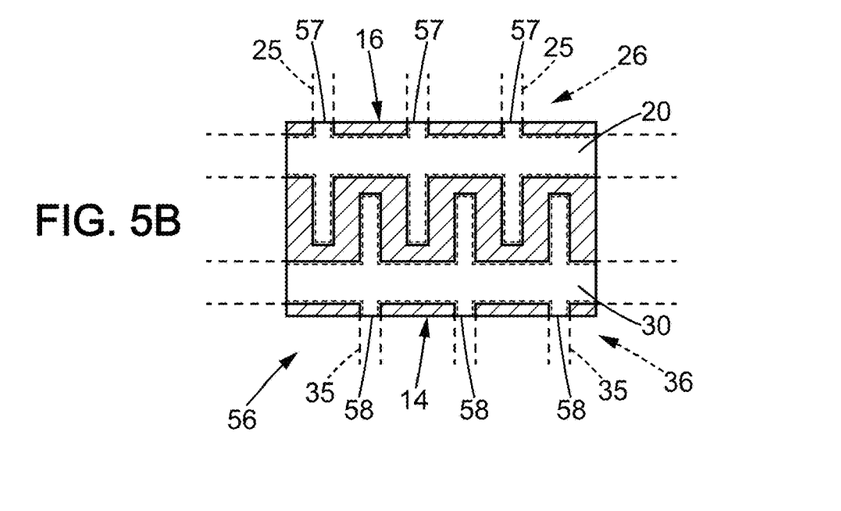

Referring to FIG. 5B, the first channel 20 of the heat exchange device 56 according to a third embodiment further comprises one of the lateral openings 57 in the side face 16 nearest the first channel. The lateral openings 57 are intended to be connected to lateral capillary heat pipes 25 of the first network 26. Similarly, the second channel 30 of the device 56 comprises lateral openings 58 in the opposite side face 14. These lateral openings 58 are intended to be connected to lateral capillary heat pipes 35 of the second network 36.

Advantageously, this embodiment allows implementing two redundant networks arranged in the same plane. The height of this heat exchange device is small. The distance between the dissipative equipment and the heat transfer fluid of the two networks is reduced. As a result, there is less heat loss in the exchanges between the two networks. This results in better heat dissipation from the panel.

According to this embodiment, the first and second networks have a grid shape. Alternatively, a star configuration can also be considered.

Figure 6A:
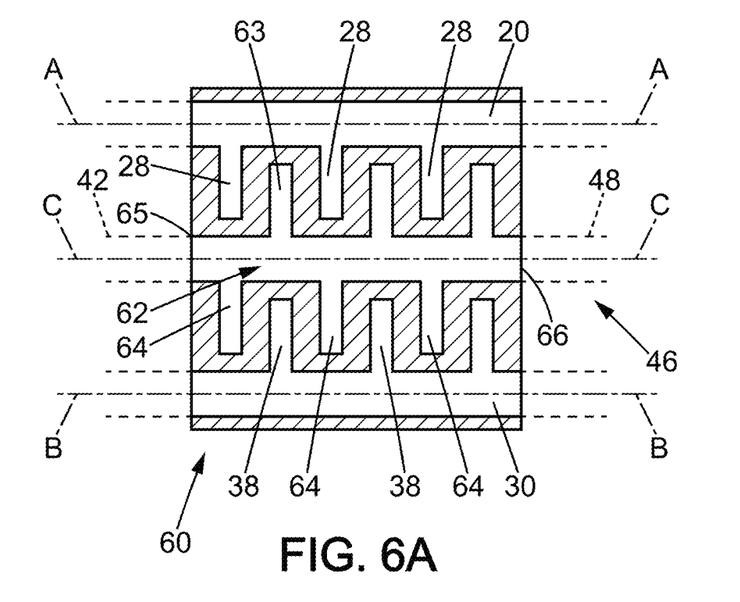

Referring to FIG. 6A, the heat exchange device 60 according to the fourth embodiment comprises a first channel 20, second channel 30, and a third channel 62 respectively having mutually parallel axes A-A, B-B, and C-C. The first channel 20 and second channel 30 lie one on each side of the third channel 62. They have shapes that are respectively identical to the shapes of the first channel 20 and second channel 30 of the device 2 according to the first embodiment.

The third channel 62 has side channels 63, 64 which alternately extend to one side and to the other side of its axis C-C. Some side channels 63 of the third channel extend parallel and close to the side channels 28 of the first channel. Other side channels 64 of the third channel extend parallel and close to the side channels 38 of the second channel.

The third channel has an opening 65 and an additional opening 66 provided for connection to the heat pipes 42, 48 of a third network 46. Advantageously, this third embodiment provides a heat exchange between three networks of capillary heat pipes which are not in fluid communication.

Figure 6B:
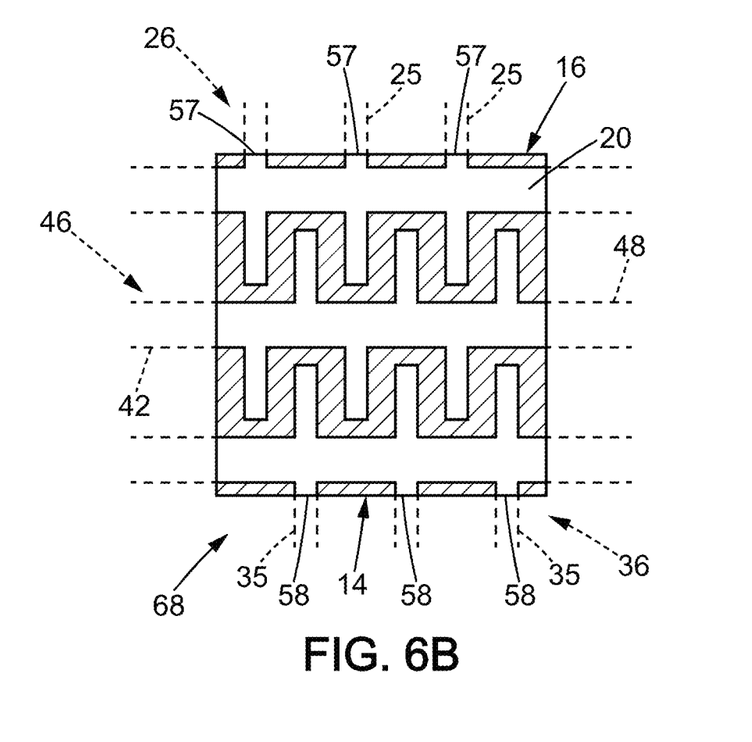

Referring to FIG. 6B, the heat exchange device 68 according to the fifth embodiment is similar to the heat exchange device 60 according to the fourth embodiment except that it further comprises lateral openings 57 in the side face 16 closest to the first channel 20. The lateral openings 57 are intended to be connected to lateral capillary heat pipes 25 of the first network 26. Similarly, the second channel 30 of the device 68 comprises lateral openings 58 in the opposite side face 14. These lateral openings 58 are intended to be connected to lateral capillary heat pipes 35 of the second network 36.

This fifth embodiment provides the same advantages as the third embodiment.

Figure 7:
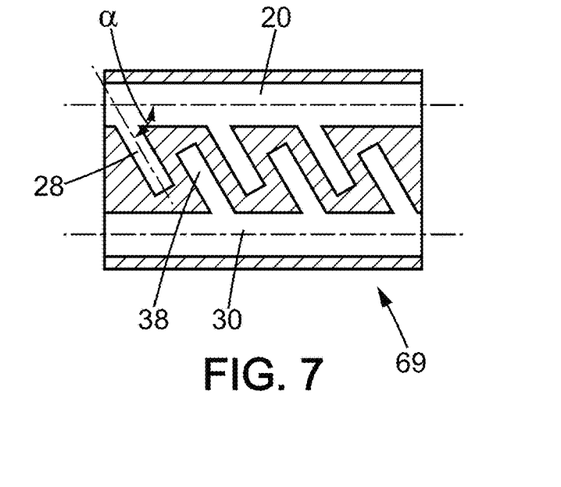

Referring to FIG. 7, the heat exchange device 69 according to the sixth embodiment is identical to the heat exchange device 2 according to the first embodiment, except that the side channels 28 and 38 respectively extend as angled arms from the first channel 20 and second channel 30. In particular, the side channels 28 form an acute angle α with the right portion of the first channel in the exemplary embodiment illustrated in FIG. 7. Similarly, the side channels 38 of the second channel 30 form the same acute angle α with the left portion of the second channel in the exemplary embodiment illustrated in FIG. 7. As with the first embodiment, the side channels 28 and 38 extend parallel and close to one another. Alternatively, the angled arm shape can be replaced by a circular arc shape.

Figure 8:
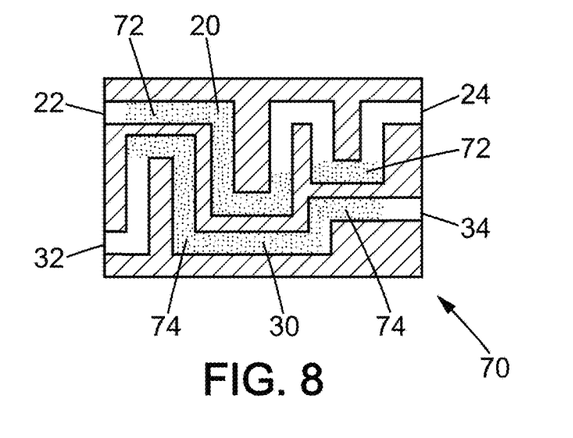

In the heat exchange device 70 according to the seventh embodiment illustrated in FIG. 8, the first channel 20 and second channel 30 are not rectilinear and do not have side channels 28, 38. In this embodiment, the first channel 20 and second channel 30 have the general shape of an irregular Greek key pattern or an irregular tooth pattern. Portions 72 of the first channel lie near portions 74 of the second channel 30. The heat transfer fluid of the first network 26 passing through the portions 72 of the heat exchange device 70 exchanges heat with the heat transfer fluid passing through the portions 74 of the second channel 30. These adjacent channel portions 72, 74 are called heat exchanging portions in the present patent application. To facilitate understanding of this embodiment, the portions 72 of the first channel and the portions 74 of the second channel are shaded in FIG. 8.

Figure 9:
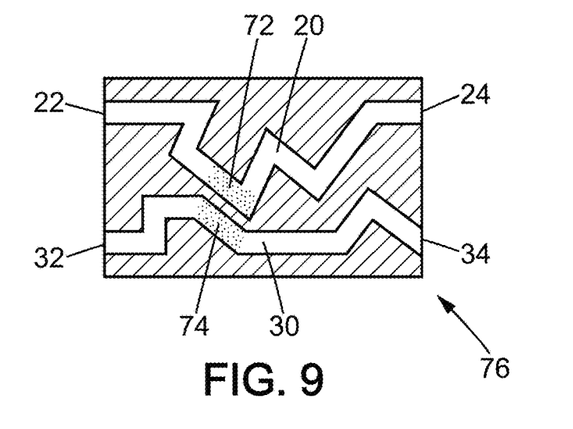
Figure 10:
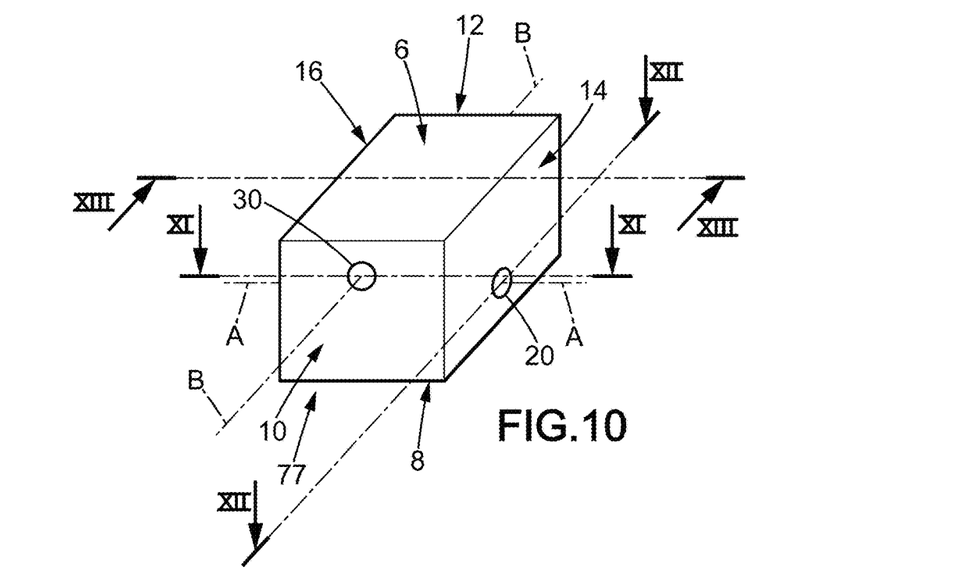
FIG. 10 is a perspective view of a heat exchange device according to a ninth embodiment of the invention.
Figure 11:
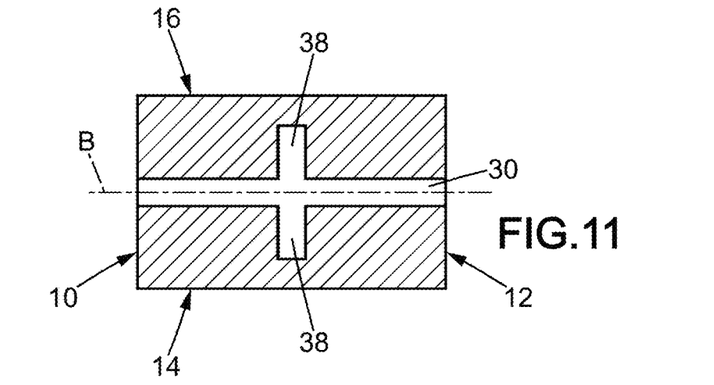
FIGS. 11 to 13 are sectional views of the heat exchange device shown in FIG. 10.
Figure 12:
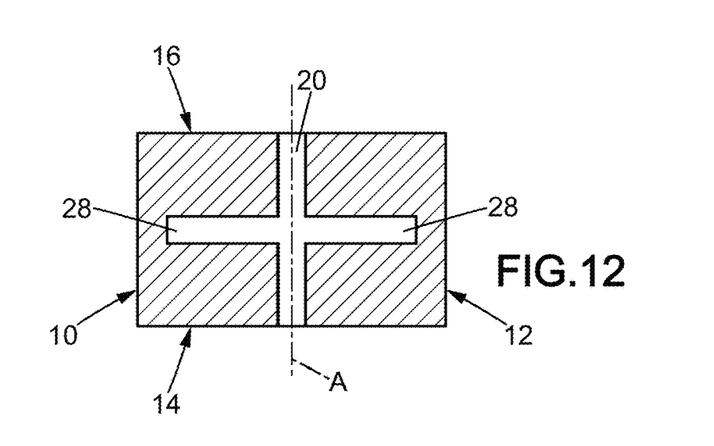
Figure 13:
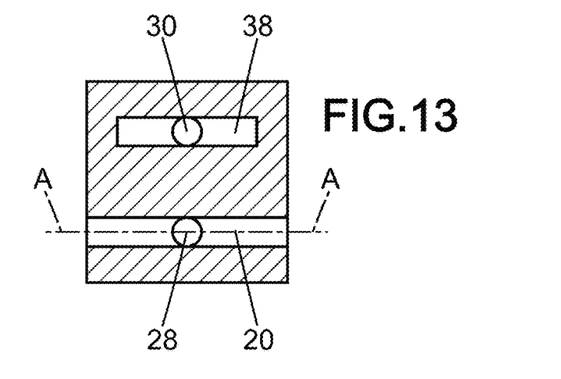

In the heat exchange device 76 according to the eighth embodiment illustrated in FIG. 9, the first channel 20 and the second channel 30 are not rectilinear and do not have side channels 28, 38. In this embodiment, the first channel 20 and second channel 30 have the general shape of jagged lines. Portions 72 of the first channel lie near portions 74 of the second channel 30. The heat transfer fluid of the first network 26 passing through the portions 72 of the heat exchange device 70 exchanges heat with the heat transfer fluid passing through the portions 74 of the second channel 30.

Referring to FIGS. 10 to 13, the heat exchange device 77 according to the ninth embodiment is greater in height than the heat exchange device 2 according to the first embodiment. In heat exchange device 77, the first channel 20 extends transversely from side face 14 to side face 16. It has two side channels 28 which extend one to each side of the first channel. The side channels 28 and the first channel 20 extend in a first plane parallel to the main faces 6, 8. The second channel 30 extends longitudinally from the front face 10 to the rear face 12. It has two side channels 38 which extend one to each side of the second channel. The side channels 38 and the second channel 30 extend in a second plane parallel to the main faces 6, 8. The first plane is located above the second plane. The side channels 38 of the second channel extend above the first channel 20, as can be seen in the sectional view of FIG. 13. During operation, the heat transfer fluid contained in the side channels 38 is able to exchange heat with the heat transfer fluid contained in the first channel 20. Similarly, the side channels 28 of the first channel extend above the second channel 30 so that the heat transfer fluid contained in the side channels 28 is able to exchange heat with the fluid passing through the second channel 30.

Advantageously, the heat exchange device 77 according to the ninth embodiment allows heat exchange between two networks of heat pipes located in different planes.

Figure 14:
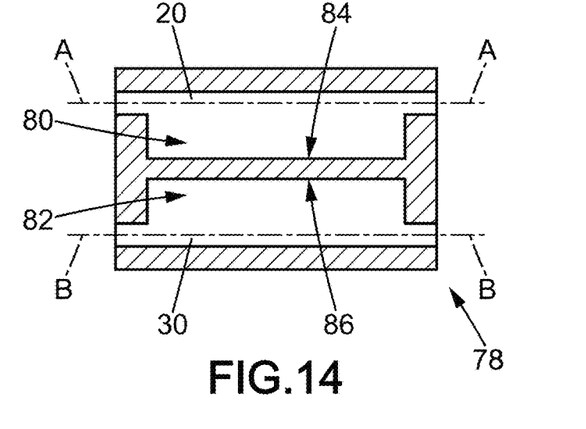

Referring to FIG. 14, the heat exchange device 78 according to the tenth embodiment is identical to the heat exchange device 2 according to the first embodiment, except that the side channels 28 of the first channel 20 and the side channels of the second channel 30 are respectively replaced by a first cavity 80 and a second cavity 82 which extend in a direction perpendicular to the axis A-A of the first channel 20 and to the axis B-B of the second channel 30. The cavities 80 and 82 respectively form a widening of channel 20 and channel 30. The first cavity 80 extends towards the second cavity 82. Similarly, the second cavity 82 extends towards the first cavity 80. The bottom 84 of the first cavity lies near the bottom 86 of the second cavity so that the heat transfer fluid contained in the first cavity can exchange heat with the heat transfer fluid contained in the second cavity. Thus, the first cavity 80 and second cavity 82 form heat exchanging portions as defined in the present patent application.

Figure 15:
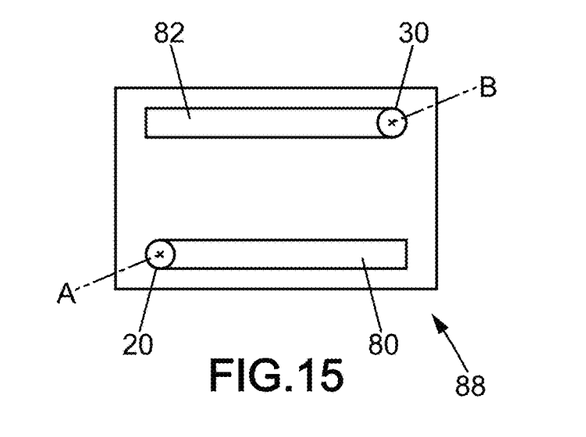

Referring to FIG. 15, the heat exchange device 88 according to the eleventh embodiment is identical to the heat exchange device 2 according to the first embodiment, except that:

the heat exchange device 88 according to the eleventh embodiment is greater in height, the first channel 20 extending in a different plane than the second channel 30.

the side channels 28 of the first channel 20 and the side channels of the second channel 30 are respectively replaced by a first cavity 80 and second cavity 82 which extend in a direction perpendicular to the axis A-A of the first channel 20 and to the axis B-B of the second channel 30. The first 80 and second 82 cavities extend parallel to the upper main face 6.

The first cavity 80 lies above the second cavity 82. The heat exchange between the heat transfer fluid of the first network 26 and the heat transfer fluid of the second network 36 occurs by means of the first cavity 80 and second cavity 82.

Figure 16:
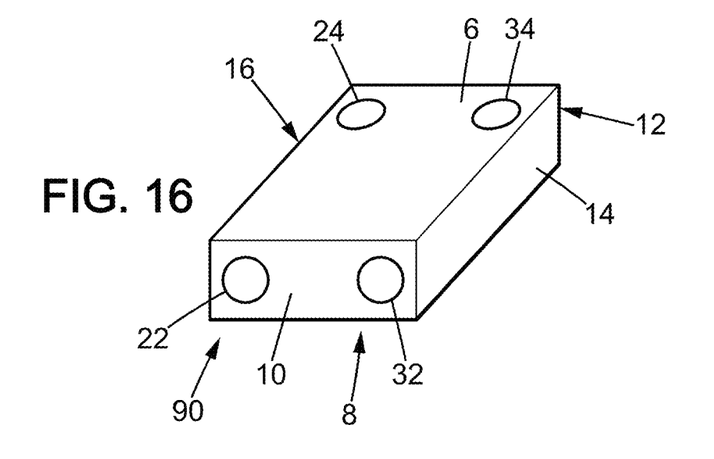
FIG. 16 is a perspective view of a heat exchange device according to a twelfth embodiment of the invention.

Referring to FIG. 16, the heat exchange device 90 according to the twelfth embodiment is identical to the heat exchange device 2 according to the first embodiment except that the additional opening 24 of the first channel and the additional opening 34 of the second channel are formed in the upper main face 6 of the heat exchange device 90. Advantageously, such a heat exchange device also makes it possible to connect two heat pipes which extend perpendicularly to one another. This heat exchange device 90 may, for example, be arranged in the corner formed by the wall facing away from Earth and the North wall of an artificial satellite. In this case, opening 22 of the first channel and opening 32 of the second channel are connected to heat pipes fixed to the away-facing wall. Opening 24 of the first channel and opening 34 of the second channel are connected to heat pipes fixed to the North wall.

Depending on the location of the electronic devices, the spacing between them, and their dissipation surface area, it is possible to combine multiple heat exchange devices as described above so as to couple the heat pipes differently.

Figure 17:
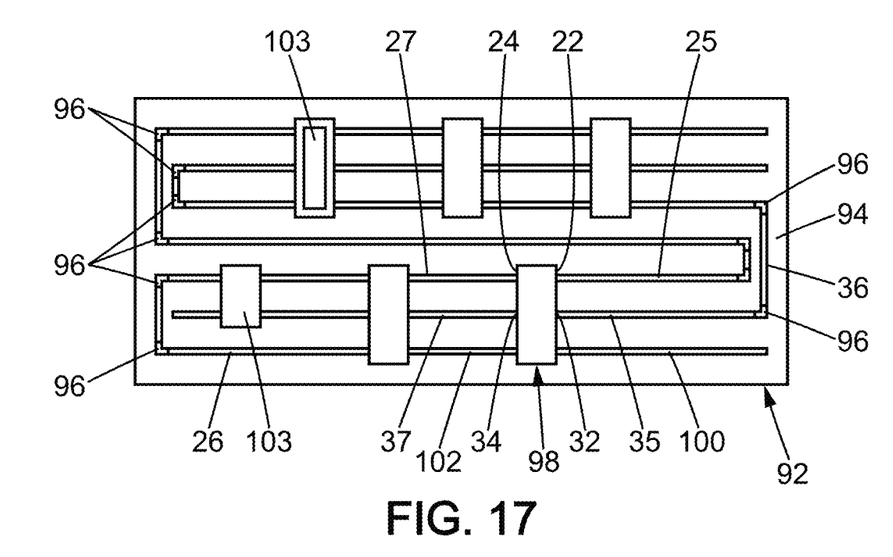
FIGS. 17 and 18 are front views of an artificial satellite wall comprising a heat exchange device according to the present invention.

Referring to FIG. 17, the present invention relates to a wall 92 adapted for mounting in an artificial satellite. This wall 92 consists of a support panel 94 carrying capillary heat pipes 25, 27 of a first network 26, capillary heat pipes 35, 37 of a second network 36, and five heat exchange devices 98 according to the present invention to facilitate heat transfer between the heat transfer fluids of the two networks.

The heat transfer fluid of the first network 26 of heat pipes is not in fluid communication with the heat transfer fluid of the second network 36 of heat pipes.

The heat transfer fluid contained in each network is typically ammonia. Alternatively, it consists for example of ethanol or methanol.

According to the embodiment shown, the capillary heat pipes of the first network 26 are attached to one another and to capillary nodes 96 so as to form a general S-shape. Similarly, the capillary heat pipes of the second network 36 are attached to one another and to capillary nodes 96 so as to form a general S-shape.

The capillary nodes 96 are, for example, made of an aluminum alloy such as AlSi10 mg by an additive manufacturing process.

In this embodiment, the capillary nodes 96 have an L-shape. Alternatively, these L-shaped capillary nodes may be replaced by a heat exchange device containing an L-shaped channel. The capillary nodes 96 and the heat transfer devices, which allow forming an angle between the two heat pipes attached thereto, are referred to as angles within the meaning of the invention.

Only the heat exchange device 98 shown at the bottom right of the figure will be described in detail. This heat exchange device 98 comprises a first channel, a second channel, and a third channel.

The first channel leads to an opening 22 and to an additional opening 24. A capillary heat pipe 25 of the first network 26 is fixed to opening 22, by an assembly method such as gluing or welding. A capillary heat pipe 27 of the first network 26 is fixed to additional opening 24.

The second channel leads to an opening 32 and to an additional opening 34. A capillary heat pipe 35 of the second network 36 is fixed to opening 32. A capillary heat pipe 37 of the second network 36 is fixed to additional opening 34.

The third channel leads to two openings connected to capillary heat pipes of the first network 26.

Figure 18:
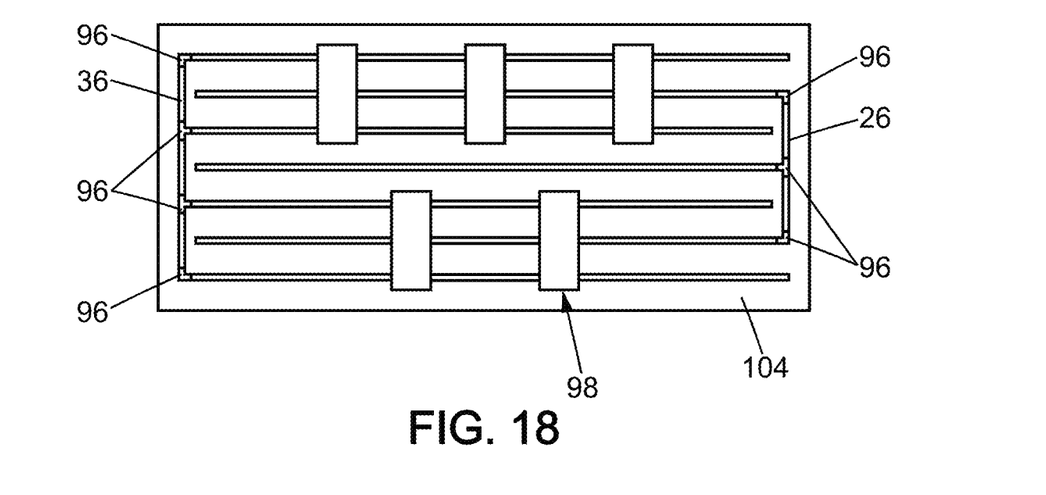

According to a variant embodiment illustrated in FIG. 18, the capillary heat pipes of the first 26 and second 36 networks are mounted on the wall 104 and are fixed to one another and to capillary nodes 96 such that each presents a general comb shape. In this embodiment, some capillary nodes 96 have a T-shape.

The wall 92 further comprises electronic devices 103. For example, in FIG. 17 an electronic device 103 is represented as being arranged on capillary channels of two networks. Another electronic device 103 is represented as being mounted with direct contact on a heat exchange device 98.

According to a variant (not shown), the capillary heat pipes of the first network and/or the second network are fixed to each other and to capillary nodes 96 so as to form a general grid shape. To implement this embodiment, capillary nodes having a star shape or heat exchange devices according to the third embodiment or fifth embodiment may be employed (see FIGS. 5B and 6B).

Alternatively, the capillary heat pipes and the heat exchange devices 98 are mounted within the support panel. In this case, the electronic devices are mounted on the panel with indirect contact with the heat exchange device 98.

Alternatively, two heat exchange devices may be mounted one on the other.

Figure 19:
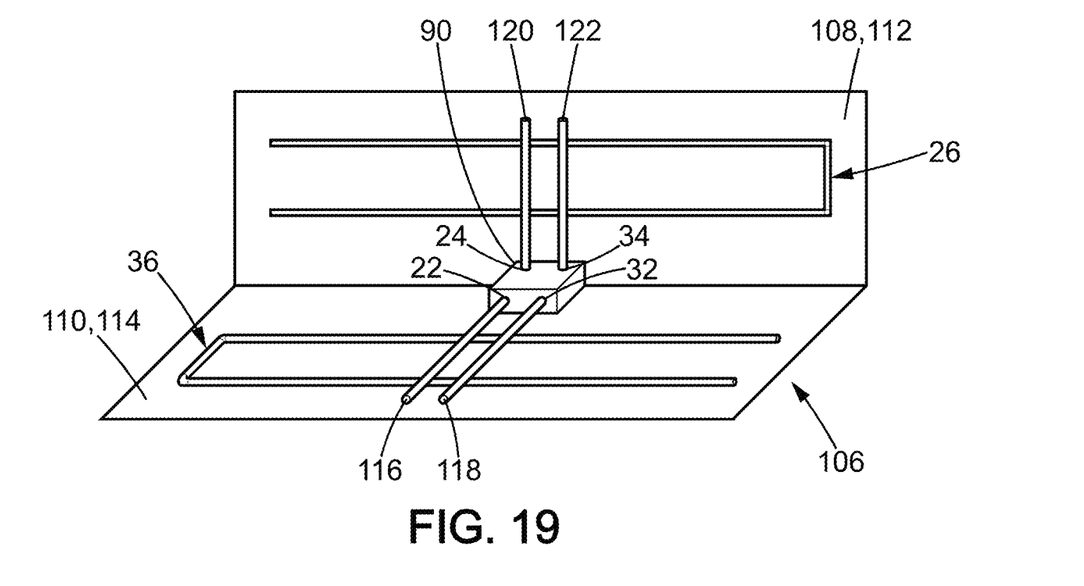
FIG. 19 is a perspective view of an assembly according to the invention.

Referring to FIG. 19, the present invention also relates to an assembly 106 of a first wall 108 and a second wall 110 intended to be mounted in an artificial satellite.

The first wall 108 comprises a first panel 112 which carries a first network 26 of capillary heat pipes. The second wall 110 comprises a second panel 114 which carries a second network 36 of capillary heat pipes. The assembly 106 further comprises a heat exchange device 90 according to the twelfth embodiment of the invention.

This heat exchange device 90 is carried by the first panel 112 or the second panel 114. It is installed at the corner formed between the two panels.

Two heat pipes 116, 118 are fixed in openings 22, 32 of the heat exchange device 90. These heat pipes 116, 118 are in thermal contact with the heat pipes of the second network 36.

Two heat pipes 120, 122 are fixed in openings 24, 34 of the heat exchange device 90. These heat pipes 120, 122 are in thermal contact with the heat pipes of the first network 26.

Alternatively, heat pipes 116 and 118 may be connected to a heat exchange device 98 shown in FIGS. 17 and 18.

Alternatively, heat pipes 120 and 122 may be connected to a heat exchange device 98 shown in FIGS. 17 and 18.

This assembly advantageously allows the conveyance of heat from one wall of the satellite to another.

Alternatively, the heat exchange devices according to the third embodiment and fifth embodiment are used to form angles.

The invention claimed is:

1. A wall configured to be mounted in an artificial satellite, the wall comprising:
   a support panel; and
   at least one heat exchange device supported by the support panel, the at least one heat exchange device comprising:
      first capillary heat pipes containing a first heat transfer fluid, the first capillary heat pipes forming a first network,
      second capillary heat pipes containing a second heat transfer fluid, the second capillary heat pipes forming a second network, and
      a solid block provided with a first channel and a second channel independent of the first channel, each of the first channel and the second channel having a capillary internal structure, the capillary internal structure being formed directly on the first channel and the second channel of the solid block,
      the first channel having
         at least one first opening connected to one of the first capillary heat pipes of the first network, and
         at least one first side channel having a longitudinal length extending perpendicularly in a direction through the solid block toward the second channel, and
      the second channel having
         at least one second opening connected to one of the second capillary heat pipes of the second network, and
         at least one second side channel having a longitudinal length extending perpendicularly in a direction through the solid block toward the first channel,
      the at least one first side channel of the first channel lying near the at least one second side channel of the second channel such that the first heat transfer fluid is able to exchange heat with the second heat transfer fluid via said at least one first side channel and the at least one second side channel,
   wherein the solid block is void of space, except for the first and second channels.

2. The wall according to claim 1, wherein the at least one first side channel has a closed terminal end, the at least one second side channel has a closed terminal end, said at least one first side channel extending parallel and adjacent to said at least one second side channel.

3. The wall according to claim 1, wherein the first channel comprises an additional first opening connected to another one of the first capillary heat pipes of the first network and the second channel comprises an additional second opening connected to another one of the second capillary heat pipes of the second network.

4. The wall according to claim 3, wherein said at least one first opening is located on a first face of said solid block, and said additional first opening is located on a second face of said solid block, said first face being perpendicular to said second face.

5. The wall according to claim 3, wherein said at least one first opening is located on a first face of said solid block, and said additional first opening is located on a second face of said solid block, said first face being parallel to said second face.

6. The wall according to claim 1, wherein the at least one first side channel is located at a distance of between 1 millimeter and 3 millimeters from the at least one second side channel.

7. The wall according to claim 1, wherein said solid block comprises a bearing face configured to be fixed to a panel of the artificial satellite, and the first channel and second channel are arranged in one and the same plane, said plane being parallel to said bearing face.

8. The wall according to claim 1, wherein said solid block comprises a bearing face configured to be fixed to a panel of the artificial satellite, and the first channel and second channel are arranged in two separate planes, said planes being parallel to said bearing face.

9. The wall according to claim 1, wherein said solid block comprises a bearing face configured to be fixed to a panel of the artificial satellite, the first channel and second channel respectively comprising the at least one first side channel and the at least one second side channel as a first cavity and a second cavity which each extend in a plane parallel to said bearing face.

10. A wall configured for mounting in an artificial satellite, said wall comprising:
    a support panel;
    at least one heat exchange device supported by said support panel, the at least one heat exchange device comprising
       first capillary heat pipes containing a first heat transfer fluid, the first capillary heat pipes forming a first network,
       second capillary heat pipes containing a second heat transfer fluid, the second capillary heat pipes forming a second network, and
       a solid block provided with a first channel and a second channel independent of the first channel, each of the first channel and the second channel having a capillary internal structure, the capillary internal structure being formed directly on the first channel and the second channel of the solid block,
       the first channel having
          at least one first opening connected to one of the first capillary heat pipes of the first network, and
          a first side channel having a longitudinal length extending perpendicularly in a direction through the solid block toward the second channel, and
       the second channel having
          at least one second opening connected to one of the second capillary heat pipes of the second network, and
          a second side channel having a longitudinal length extending perpendicularly in a direction through the solid block toward the first channel,
       the first side channel of the first channel lying near the second side channel of the second channel such that the first heat transfer fluid is able to exchange heat with the second heat transfer fluid via the first side channel and the second side channel,
    wherein the solid block is void of space, except for the first and second channels, and
    the first channel having two openings to the exterior including the at least one first opening, the second channel having two openings to the exterior including the at least one second opening, the first channel of the at least one heat exchange device being connected to the first capillary heat pipes, the second channel of the at least one heat exchange device being connected to the second capillary heat pipes.

11. The wall according to claim 10, further comprising at least one electronic device fixed to said support panel, in direct or indirect thermal contact with said at least one heat exchange device.

12. The wall according to claim 10, further comprising angles,
  wherein the first capillary heat pipes are fixed to said angles to form a comb-shaped configuration.

13. The wall according to claim 10, further comprising angles,
  wherein the first capillary heat pipes are fixed to said angles to form an S-shaped configuration.

14. The wall according to claim 10, further comprising angles,
  wherein the first capillary heat pipes are fixed to said angles to form a matrix-shaped configuration.

15. The wall according to claim 1, wherein the solid block is made in one piece.

* * * * *